(12) United States Patent
Cohen et al.

(10) Patent No.: US 8,645,103 B2
(45) Date of Patent: Feb. 4, 2014

(54) METHOD FOR CAPTURE, AGGREGATION, AND TRANSFER OF DATA TO DETERMINE WINDSHIELD WIPER MOTION IN A MOTOR VEHICLE

(76) Inventors: Arthur L. Cohen, Cupertino, CA (US); John R. Haggis, San Jose, CA (US)

( * ) Notice: Subject to any disclaimer, the term of this patent is extended or adjusted under 35 U.S.C. 154(b) by 123 days.

(21) Appl. No.: 13/052,006

(22) Filed: Mar. 18, 2011

(65) Prior Publication Data

US 2011/0231119 A1    Sep. 22, 2011

Related U.S. Application Data

(60) Provisional application No. 61/315,346, filed on Mar. 18, 2010.

(51) Int. Cl.
    *H03F 1/26* (2006.01)
(52) U.S. Cl.
    USPC .......................................... 702/190

(58) Field of Classification Search
    USPC .......................................... 702/190
    See application file for complete search history.

(56) References Cited

U.S. PATENT DOCUMENTS

| 4,236,099 A | * | 11/1980 | Rosenblum | 315/83 |
| 5,182,502 A | * | 1/1993 | Slotkowski et al. | 315/159 |

* cited by examiner

*Primary Examiner* — Stephen Cherry
(74) *Attorney, Agent, or Firm* — Craig M. Stainbrook; Stainbrook & Stainbrook, LLP

(57) ABSTRACT

Apparatus for capturing, aggregating, and transferring data to detect windshield wiper motion in a motor vehicle so as to alert the driver of the need to turn on headlights. The apparatus includes motion-sensing hardware having a microprocessor programmed to detect rhythmic movement of shadows at regular intervals or to receive digitized signals from inertial sensors and to sense rhythmic patterns of vibration or motion in the car and characterize and filter the patterns to accurately distinguish wiper motions from other motions. The software then instructs the microprocessor to output a perceivable alert to the driver indicating that vehicle lights must be turned on.

6 Claims, 8 Drawing Sheets

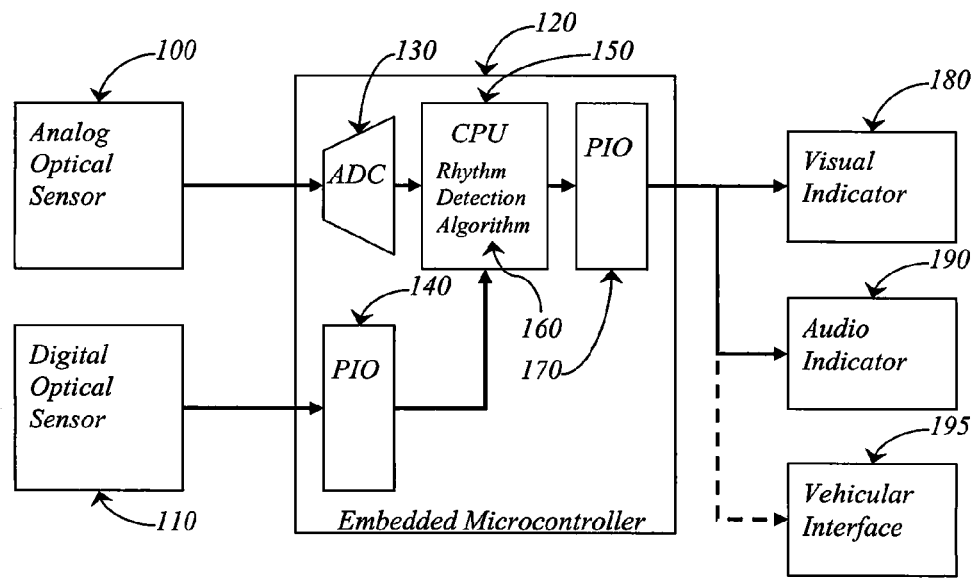
FIG._1
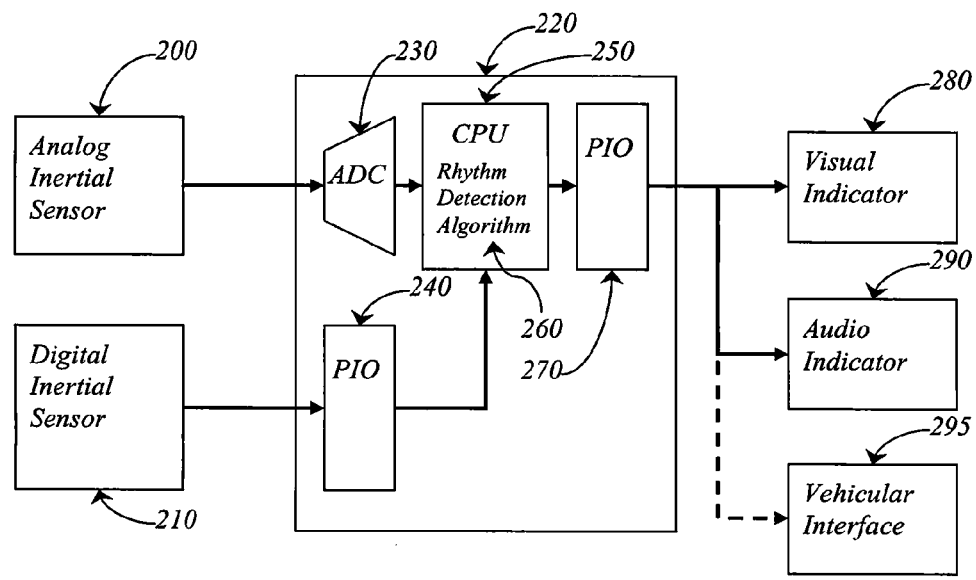
FIG._2

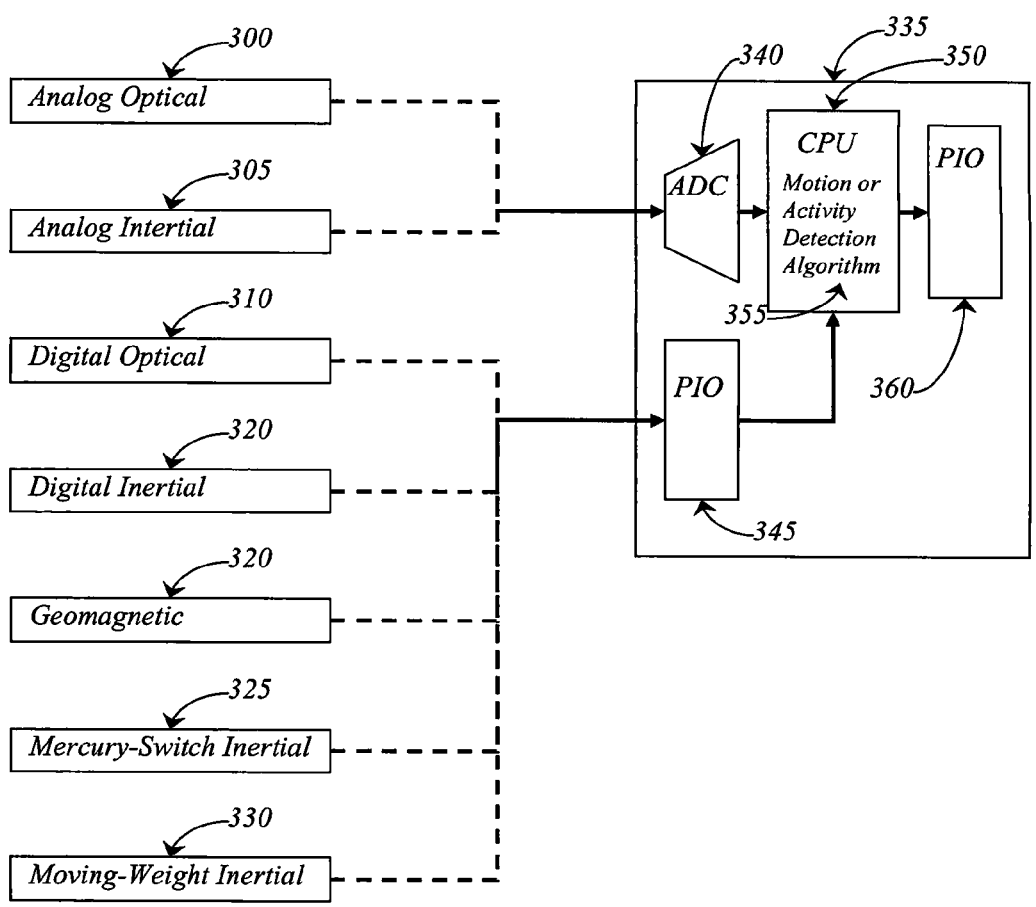
FIG._3

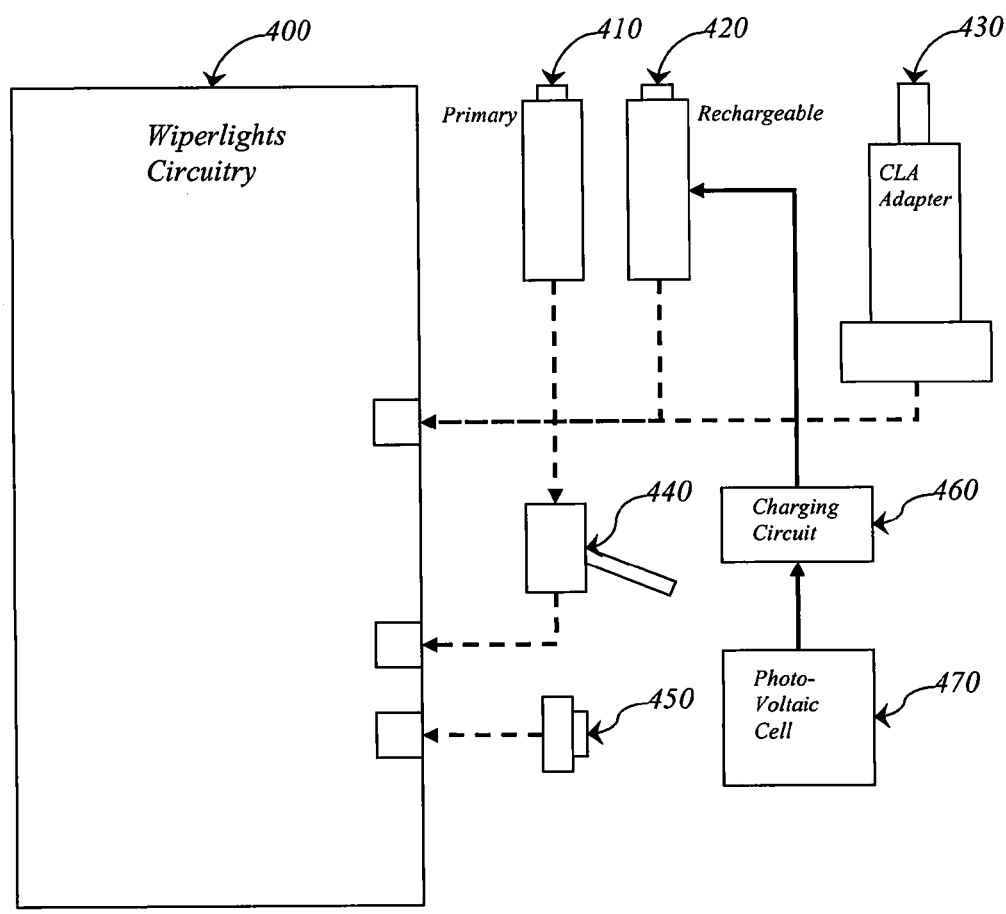
FIG._4

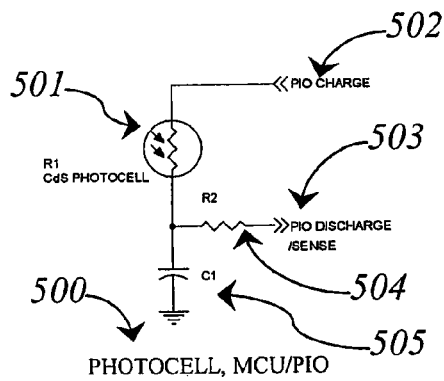
FIG._5A
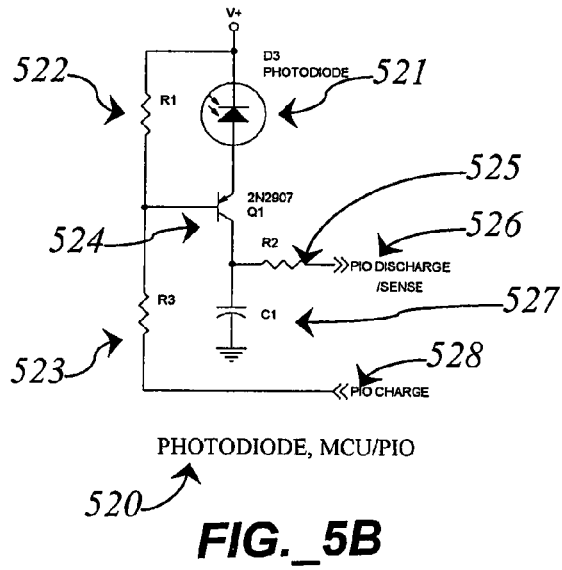
FIG._5B
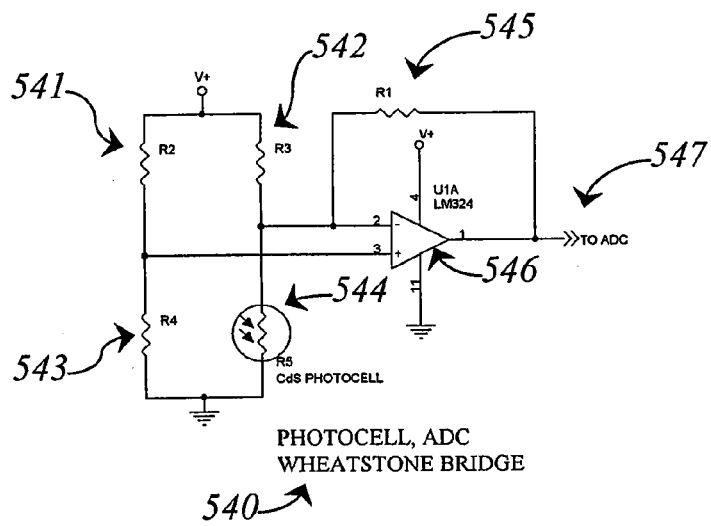
FIG._5C

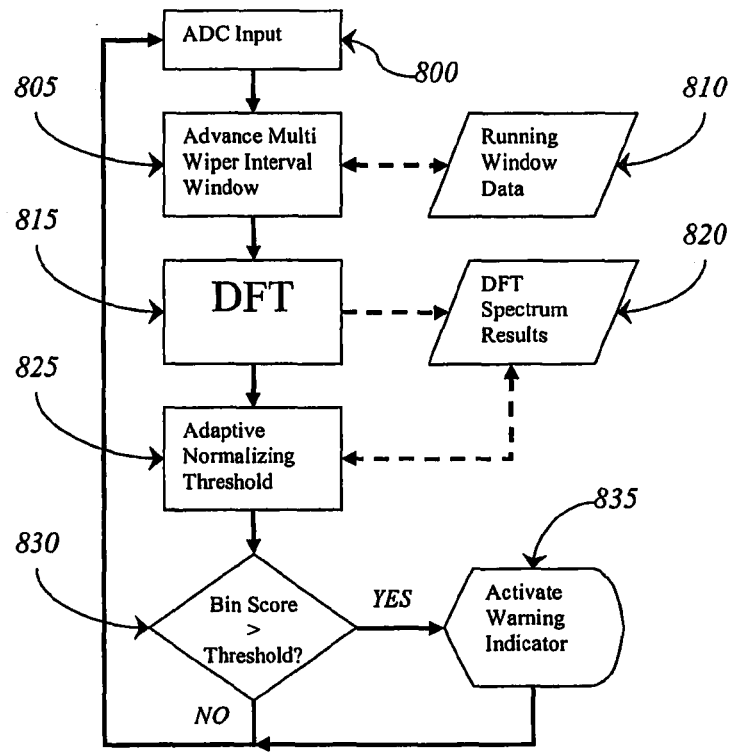
*FIG._8*
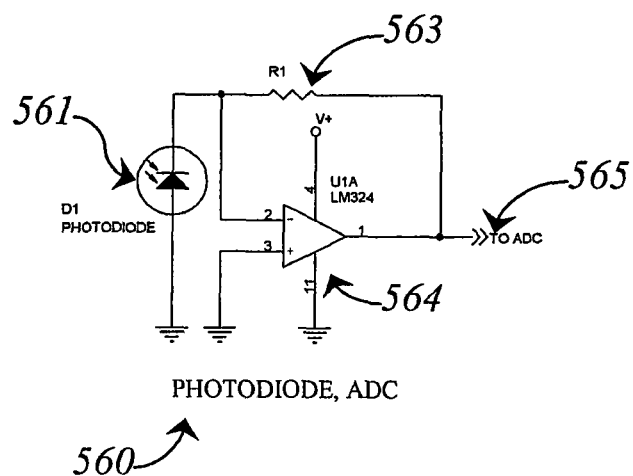
PHOTODIODE, ADC
*FIG._5D*

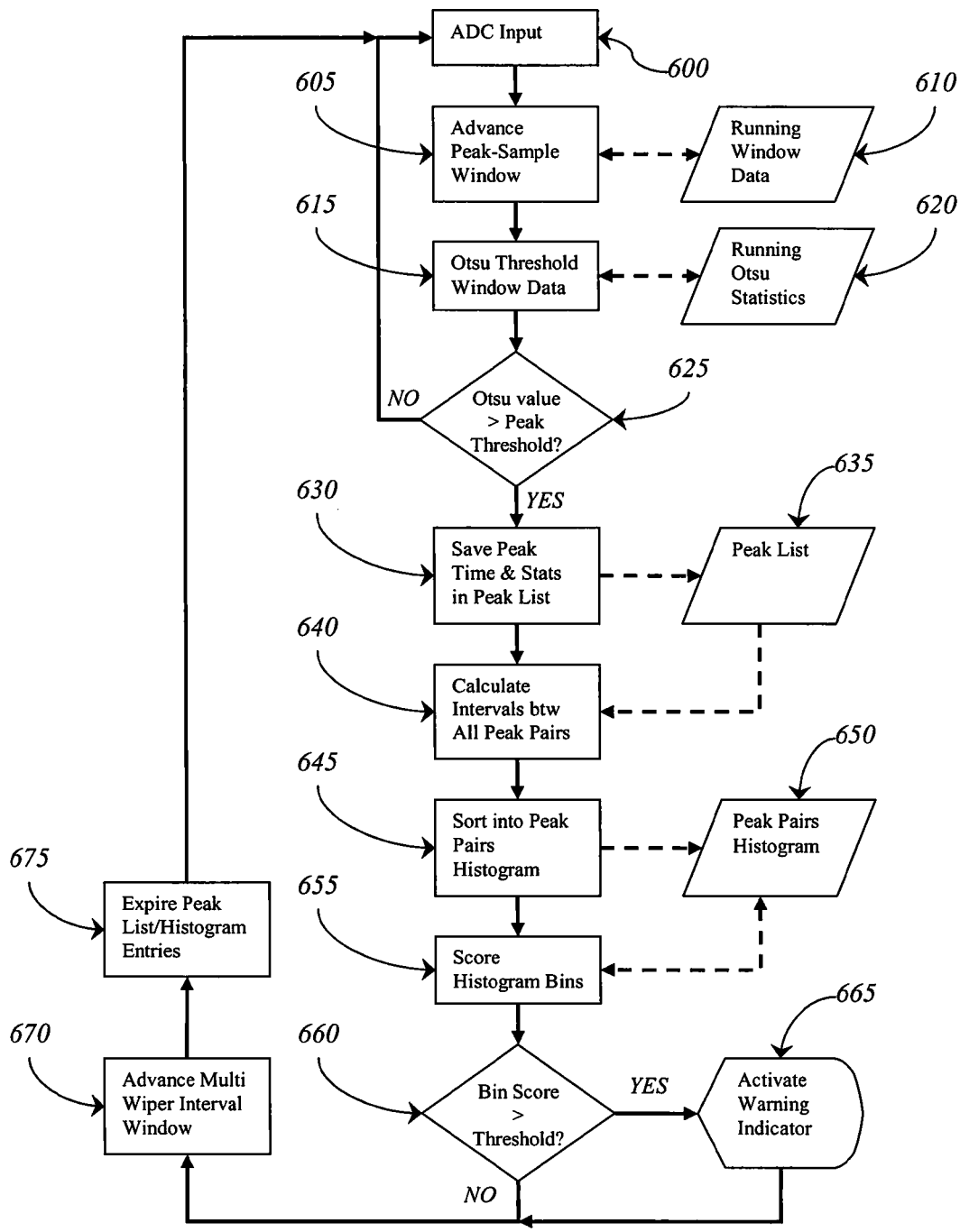
FIG._6

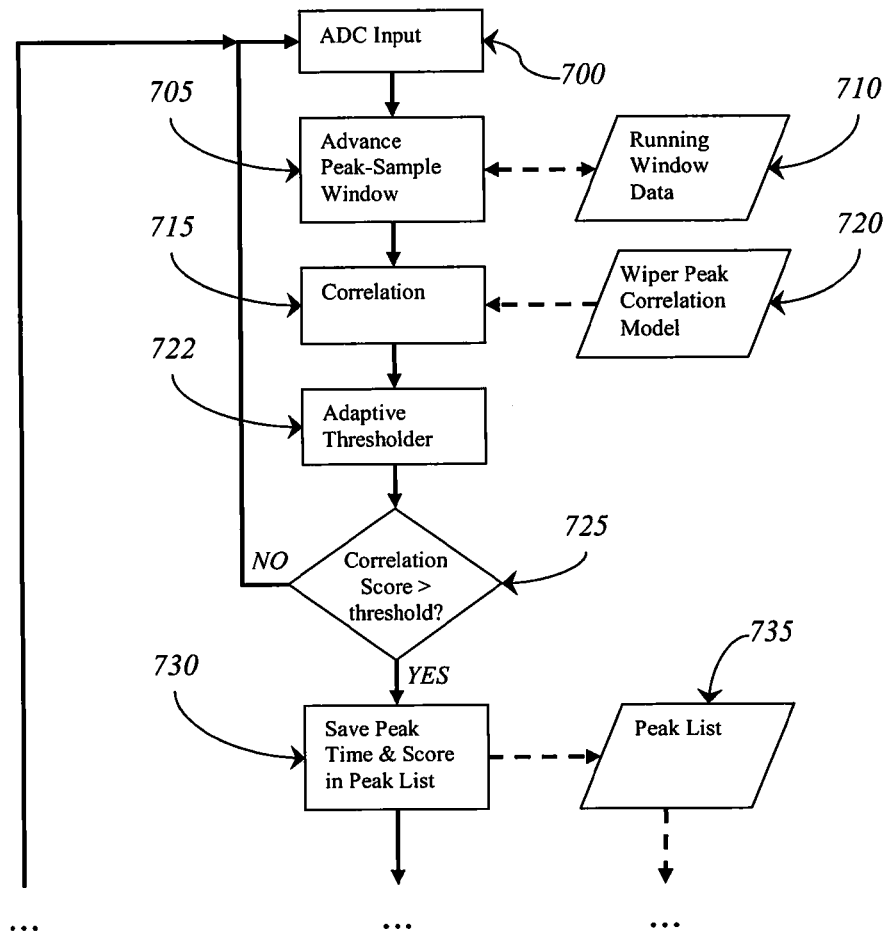
(To 640 Calculate Intervals between Peak Pairs in FIG. 6)
FIG._7

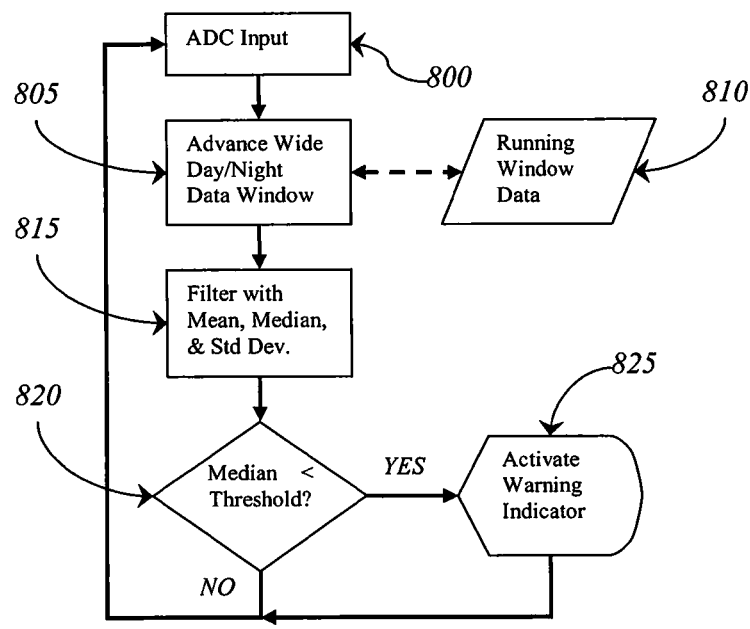
FIG._9

METHOD FOR CAPTURE, AGGREGATION, AND TRANSFER OF DATA TO DETERMINE WINDSHIELD WIPER MOTION IN A MOTOR VEHICLE

CROSS REFERENCES TO RELATED APPLICATIONS

The present application claims the benefit of U.S. Provisional Patent Application Ser. No. 61/315,346, filed Mar. 18, 2010, (Mar. 18, 2010.)

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to a method for capture, and analyzing data of motion, and more particularly to ascertaining any motion of a windshield wiper in a motor vehicle and providing a audio and visual indicator that such motion has been detected.

2. Discussion of Related Art Including Information Disclosed Under 37 CFR §§1.97, 1.98

California and several other states recently passed laws requiring that motor vehicle drivers turn on their vehicle headlights when driving in the rain and using their windshield wipers. Numerous citations have been issued and fines imposed for disobeying these laws. Under the applicable laws, it is required that drivers turn on their headlights in the daytime or dusk time periods when windshield wipers are in use. The challenge, however, is that because most drivers are unaccustomed to turning on headlights during the daytime, and they often forget to turn the lights on, risking safety of others on the road as well as risking their own safety. Thus, the motivation for the laws. Even a first offense invites large fines of several hundreds of dollars. Similar to safety belts car indicator warnings, there is a need for a lost cost aftermarket vehicle warning system that bypasses the need for using aftermarket installers.

The present invention discloses visual and audio methods of warning a driver. Visual indicators can take multiple forms in which an illuminated mini-indicator, such as "Turn-on Headlights" is lit when the windshield wipers are detected to be moving. Other indicators can take the form of various backlit images, icons, or simply an indicator light.

The other method of warning a driver is through an audio indicator. Various sound options can be used to warn the driver that the headlights must be turned on due to the fact the windshield wipers are in motion.

In addition, a combination of audio and visual warning system is a common method to get the attention of a driver for an important safety message. Since the above-explained law is becoming applicable law in most states, having an aftermarket warning indicator is a useful means for helping drivers remain safe and lawful.

A secondary feature of the visual warning system is to indicate that lights should be on when dusk or dawn conditions. Although there is no specified law requiring the exact moment when the lights should be switched on, this added safety feature is helpful to avoiding accidents.

BRIEF SUMMARY OF THE INVENTION

The present invention is a method for capture, detection, and indication to determine windshield wiper motion in an automotive vehicle. This method utilizes a motion-sensing system that includes hardware and software. The motion sensing system is programmed and maintained via an embedded microprocessor that utilizes digitized optical information to detect rhythmic movement of shadows at regular intervals and to instruct the processor to take certain actions as necessary to alert the driver of the automotive vehicle.

Another embodiment of the invention uses digitized signals from inertial sensors to sense rhythmic patterns of vibration or motion in the car and uses the microprocessor to characterize and filter the patterns to accurately detect wiper motion.

It is therefore an object of the present invention to appropriately detect wiper movement and alert the driver of the motor vehicle that the headlights should be turned on.

It is another object of the present invention to detect low light driving conditions and alert the driver that their headlights need to be turned on.

A further object or feature of the present invention is to provide both audio and sensory information to alert the driver of their need to turn on their headlights.

Integration into Other Automotive Systems.

The wiper lights warning device of the present invention may be integrated into the lighting system to automatically turn on the automobile lights when the wiper blades are in motion or when dusk or dawn conditions are recognized by the wiper lights system.

Though the preferred embodiment of the invention is a standalone device, the same functionality can be integrated into built-in car controllers, aftermarket car computers, GPS units, or any other electronic automobile appliance with an embedded processor.

Power Sources and Management.

The wiper lights warning device can draw its current directly from the automobile electrical system via a cigarette lighter adapter (aka "accessory") plug, from internal batteries, or from solar power (photovoltaic cells), or some combination of the above.

Solar cells can charge an internal rechargeable battery (e.g., NiCd, NiMH, LiIon, or Li-Polymer) for operation when sunlight or ambient artificial light are insufficiently bright. Primary cells may be used alone or in combination with solar power, rechargeable cells, and/or vehicular power.

When operating from standalone power (primary or rechargeable cells), it is necessary to conserve power. The wiper lights device uses a very-low-power microcontroller unit that consumes very little current when dormant, which results in a long "shelf life" for the unit between primary battery changes or solar charging.

Since detection of wiper activity requires significant processing power, the wiper lights device has a means for switching from dormant mode to fully operational mode. In one embodiment of the device, a manual power switch is used, which can be a bistable switch that interrupts the flow of current from the power source, or a momentary switch that signals the microcontroller to switch between dormant and fully-operational modes.

In another embodiment of the invention, a motion detector is employed to detect motion of the vehicle. The motion detector can detect vibrations or larger inertial movements. This can be accomplished with an electronic accelerometer IC chip, with a geomagnetic field detector chip or module, or more economically (financially and economically) with a mercury or magnetic-weight inertial switch. The microcontroller samples the inertial or vibration sensor at infrequent intervals to minimize processing power consumption. When it detects motion, the microcontroller switches the operational mode from dormant to fully operational, and when it does not detect motion for an extended period of time, the microcontroller switches the operational mode back to dormant for low power consumption.

Motion detection and automatic switching of operational modes results in long life and convenient operation, requiring no connection to vehicular power or attention to manual on/off switching on the device. The wiper lights device can be placed in operation and ignored until it signals the driver, for maximum convenience and assurance that it will be active when needed.

Inertial sensors employed for the purpose of motion detection can also detect the rhythmic vibrations of the windshield wiper arms or other parts of the wiper system, and can be used as an alternative to the optical detection of wiper movement.

In the alternative, optical sensors for detecting wiper movement can also measure the absolute level of illumination in order to determine the absence of sufficient daylight so as to signal the driver to turn on headlights in nighttime darkness or other low-light conditions.

Optical sensors can also be used to detect ambient activity for the purpose of switching the operational mode between dormant and active. In order to minimize power consumption, the optical sensor is sampled infrequently, and a simple algorithm employed for detecting short-term changes in illumination level, such as statistical accumulation and thresholding of the standard deviation of the results accumulated within a moving sample window of time.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic block diagram of the method for capture, detection, and indication for determining the motion of wiper blades in an automotive vehicle;

FIG. 2 is a schematic block diagram of another embodiment of the method for capture, detection, and indication for determining the motion of wiper blades in an automotive vehicle;

FIG. 3 is a schematic block diagram showing the means for detecting activity or motion for the purpose of switching operational modes between dormant and fully functional;

FIG. 4 is a schematic block diagram showing the variety of power sources and power management for different embodiments of the invention;

FIGS. 5A-D are schematic circuit diagrams illustrating alternative methods of analog optical sensing, including, FIG. 5A, showing a circuit combining a photocell and PIO pseudo-ADC; FIG. 5B, which uses a photodiode in the capacitor-charge-threshold pseudo-ADC; FIG. 5C, showing a circuit that uses a photocell in a Wheatstone Bridge and a buffer operational amplifier (op-amp) for input to an actual ADC; and FIG. 5D, showing an alternative circuit using a buffered/amplified photodiode input for presentation to an actual ADC;

FIG. 6 is a schematic block diagram of the Peak Period Detection method of detecting and confirming the presence of wiper motion;

FIG. 7 is a schematic block diagram of the Correlation Detection method of detecting and confirming the presence of wiper motion;

FIG. 8 is a schematic block diagram of the Discrete Fourier Transform method of detecting and confirming the presence of wiper motion; and FIG. 9 is a schematic block diagram of the signal processing required for background detection of day versus night.

DETAILED DESCRIPTION OF THE INVENTION

Referring to FIGS. 1 through 9, there is illustrated therein a method for capture, detection, and indication/effectuation for determining motion in wiper blades in an automotive vehicle.

The Analog Optical Sensor 100 is a CdS photocell, phototransistor, photodiode, LED, or other optical sensor which develops a voltage directly or through a buffer amplifier to indicate the amount of light falling on it. This voltage conducts to an Analog Digital Converter (ADC) 130 inside or outside a Microcontroller 120 which digitizes the voltage level into a binary code. The code conducts to the CPU 150 which employs a Rhythm Detection Algorithm 160 to detect the rhythm of the wipers and differentiate it from other shadows and optical artifacts. Upon determining the presence of moving wiper blades, the CPU triggers an output or outputs via a PIO register 170. One possible output is a Visual Indicator 180 which could be a backlit icon or word such as "Turn On Headlights." Another possible output could be an Audio Indicator 190 such as tone or recorded vocal message with a warning to turn on the headlights. Another possible output could be a Vehicular Interface 200 such as a relay to actually turn on the headlights or trigger some other built-in automotive indicator.

In the alternative, a simpler Digital Optical Sensor 110 could be employed to send a binary signal into the Microcontroller 120 via a PIO port 140 to bypass and eliminate the need for an ADC 130. This binary signal would pulse with the shadow of the wiper blades and provide a usable signal to the CPU 150 and the Rhythm Detection Algorithm 160.

Referring to FIG. 2, wherein like reference numerals refer to like components in the various views, there is illustrated therein another embodiment of the method for capture, detection, and indication/effectuation for determining motion in wiper blades in an automotive vehicle. The Analog Inertial Sensor 200 is a mechanical, magnetic, or other integrated-circuit chip inertial sensor which develops a voltage directly or through a buffer amplifier to indicate an inertial force. This voltage conducts to an Analog Digital Converter (ADC) 230 inside or outside a Microcontroller 220 which digitizes the voltage level into a binary code. The code conducts to the CPU 250 which employs a Rhythm Detection Algorithm 260 to detect the rhythm of the wipers and differentiate it from other accelerations and inertial artifacts. Upon determining the presence of moving wiper blades, the CPU triggers an output or outputs via a PIO register 270. One possible output is a Visual Indicator 280 which could be a backlit icon or word such as "Turn On Headlights." Another possible output could be an Audio Indicator 290 such as tone or recorded vocal message with a warning to turn on the headlights. Another possible output could be a Vehicular Interface 295 such as a relay to actually turn on the headlights or trigger some other built-in automotive indicator.

In the alternative, a Digital Inertial Sensor 210 could be employed to send a binary signal or signals including status lines or serial communication into the Microcontroller 220 via a PIO port 240 (or dedicated serial I/O peripherals) to bypass and eliminate the need for an ADC 230. This binary signal would pulse with the shadow of the wiper blades and provide a usable signal to the CPU 250 and the Rhythm Detection Algorithm 260.

Referring to FIG. 3, there is illustrated therein a depiction of the means for detecting activity or motion for the purpose of switching operational modes between dormant and fully functional. This serves as an "auto-on" and/or "auto-off" function, to eliminate the need for a physical switch or pushbutton, or the requirement of the user actively turning the device on or off. The Microcontroller 335 and its CPU 350 wake up from a very-low-power standby state ("Off" mode) by being triggered by an interrupt from one of its digital activity sensors, 310-330, or by a low-power timer interrupt so that it can poll its analog activity sensors, 300-305. The Analog or Digital Optical sensors 300 and 310 are the preferred embodiment of this function because they make use of the same hardware used to sense wiper activity. Many other sensors can satisfy the same function, such as solid-state inertial sensors 305 and 320, solid-state or flux-gate geomagnetic compass modules 320, a moving-mercury intertial switch 325, or a moving-weight pendulum-and-contact mechanical switch 325, which could be as simple as a weighted wire or bolt dangling through a washer, with the bolt and the washer forming contacts of a switch wired to the PIO port 345 of the Microcontroller 335. The CPU 350 incorporates a simple algorithm 355 to detect the motion. In the case of the digital sensors 310-330, the CPU's algorithm is to simply respond to the Off-mode wakeup, and verifies it by recording a change in state at the PIO port 345 input. In the case of the analog sensors 300-305, the CPU's algorithm would be to poll them on a regular basis by the aforementioned timer wakeup, keep running statistics on the values, and when the variance in the values exceeds a certain threshold, the CPU changes the operating mode to On-mode. While in the On-mode, in parallel with wiper-motion detecting algorithms, the CPU continues to monitor changes in state of the motion detectors. Whenever the variance of the analog-inpu values falls back below the threshold, or the time between triggers of the digital inputs exceeds a threshold, the CPU changes to Off-mode by putting the microcontroller into a very-low-power state to conserve battery power.

Referring next to FIG. 4, there is illustrated therein a depiction of the means of power sources and power management for different embodiments of the invention. The wiper lights warning device circuitry 400 requires a modest source of DC current to operate. The power source of the preferred embodiment of the invention is primary cells 410 of the alkaline or other non-rechargeable variety, which power the device for a period of many months before replacement is necessary. Other embodiments of the invention are powered by rechargeable cells 420 of the Nickel Cadmium (NiCd), Nickel Metal Hydride (NiMH), or Lithium-Ion/Lithium Polymer (LiIon/LiPoly) varieties or related technologies. The wiper lights device may also be powered by a Cigarette-Lighter Accessory-type adapter 430 to take its power from the automobile battery or generating system. In the case of power supplied by rechargeable cells, it is necessary to have a means to charge them. They may be removable and charged by an external charger either in or outside the vehicle. The preferred method is to use photovoltaic cells (solar cells) 470 and charge the cells via a charging circuit 460 to deliver the necessary charging voltage and current profiles required by the particular variety of rechargeable cells employed. Another embodiment of the invention includes, as part of the charging circuit 460, a boost regulator with current limiting to achieve the charging voltage level of the cells even in environments with limited illumination. In an embodiment of the invention which does not use auto-on and auto-off, a simple switch 440 turns on or off the wiper lights device 400 by allowing or interrupting the flow of current from the power source 410-430. In another embodiment of the invention, a momentary-contact pushbutton 450 signals the wiper lights circuitry 400 whose CPU switches as a result from low-power Off-mode to functional On-mode and vice versa on a subsequent press.

Referring now to FIG. 5A through 5D, there is illustrated therein a depiction of the means of detecting the illumination level for different embodiments of the invention. The illumination level is used to detect wiper movement for the main purpose of the invention, to detect ambient light levels for the auxiliary function of low-light headlight warning, and to detect changing light levels for the auxiliary functions of auto-on and auto-off. Four versions of light-sensing circuitry are included here not for the purpose of illustrating innovation, as the represent prior art, but for the purpose of teaching the preferred methods of carrying out the invention.

The illumination detection methods are broken down by photocell (photo-resistor) vs. photodiode, and by ADC input versus capacitor-charge-threshold PIO pseudo-ADC. The first circuit 500, shown in FIG. 5A, is a combination of photocell and PIO pseudo-ADC. The MCU grounds the PIO Discharge/Sense pin 503 as an output to discharge the capacitor through the resistor 504. It then switches the PIO Discharge/Sense pin 504 to an input, preferably connected internally to a comparator, but a Schmitt trigger input will work as well if the dynamic range of the input is wide enough to tolerate reduced accuracy. Next it Asserts the PIO Charge pin 502 high as an output which charges the capacitor 505 through the photocell 501, and the CPU gauges the time it takes for the Sense pin 504 to reach threshold switching the input or the comparator. This time is proportional to the light falling on the photocell and is used as the ADC value. This is the preferred method of carrying out the wiper lights invention because it minimizes parts count, cost, and complexity.

The next circuit 520, shown in FIG. 5B, uses a photodiode in the capacitor-charge-threshold pseudo-ADC. In a similar fashion, the CPU grounds the PIO Discharge/Sense pin 526 as an output to discharge the capacitor 527 through the resistor 526. It then switches the Sense pin 526 to an input connected internally to a comparator or Schmitt trigger PIO input. Next it asserts the PIO Charge output pin 528 low as an output to energize the bias resistor divider 522 and 523 and turn on the transistor 524 to start the charge cycle. With the transistor turned on, the collector current is essentially the same as the photodiode sensor input flowing into the emitter. The capacitor 527 integrates this current, presenting a rising voltage to the Sense input 526, and the CPU gauges the time it takes for this voltage to trip the threshold and uses that time as the ADC value.

The third circuit 540, illustrated in FIG. 5C, uses a photocell in a Wheatstone Bridge and a buffer operational amplifier (op-amp) for input to an actual ADC for a much higher accuracy measurement. The Wheatstone Bridge formed by resistors 541, 542, 543, and photocell 544 creates a voltage offset that is wired into the differential inputs of an op-amp 546. The gain of the amplifier is set by the feedback resistor 545 and presents a high-gain illumination-level signal to the ADC input 547.

The last circuit 560, illustrated in FIG. 5D, uses a buffered/amplified photodiode input for presentation to an actual ADC. The photodiode 561 creates a small voltage drop according to the current flowing through it via the amplifier 564 output voltage and gain resistor 563. This voltage drop which follows the illumination level is wired to the differential inputs of the op-amp and amplified for presentation to the ADC input 565.

Signal Processing for Wiper Detection.

A salient feature of the present invention is in the signal-processing software algorithm for detecting the rhythmic action of the wipers from an optical sensor or a vibration sensor. The algorithm enables detection of the wiper rhythm across a wide range of wiper speeds all the way down to long-delay intermittent wiper action. Very importantly, it differentiates the action of the wipers from other rhythmic and random noise picked up by the optical sensors. Rhythmic noise can be produced by any regular feature in the landscape that filters the sun with repeating shadows, like stands of trees lining the road, wires of a suspension bridge, girders of a cantilever bridge, succession of houses or buildings with regular spaces in between. Random noise is produced by irregular patters of trees and leaves, rain and snow and any other precipitation, irregular patterns of girders, "telephone" poles, streetlight poles, irregular houses or buildings.

To handle these unique conditions of detection, three main embodiments of the invention utilize three alternative software algorithms. These alternatives comprise peak-period detection, correlation peak detection, and discrete Fourier transform with threshold.

Peak-Period Detection.

Referring to FIG. 6, there is illustrated a schematic depiction of the Peak-Period Detection algorithm for detecting wiper motion.

The first alternative algorithm detects and characterizes peaks in the inverted input data which represent shadows cast on the light detector.

The ADC input 600 from the optical sensor is fed 605 into a running window of data 610. The basic detection of peaks is accomplished by a histogram thresholding algorithm 615. Data for the histogram threshold is accumulated within a narrow window. Whereas running data for period classification is collected over a wide window can encompass many periods of a long-delay intermittent wiper, peak detection must be sampled within a narrow window. Optimally, this window is twice the width of a wiper shadow, to suit the thresholding. The thresholding algorithm 615 follows the computationally-minimal technique developed by Otsu, et. al., for calculating between-group variance on a bimodal histogram. A running histogram on the aforementioned small-window sample of the inverted illumination data 610 results in a bimodal distribution (a peak of high brightness data bins and a peak of low brightness data bins with a trough in between). The between-group variance statistic of a bimodal distribution results in a peak at the best threshold level. The Otsu algorithm 615 calculates the between-group variance on a running stream of data 610 by accumulating several statistics 620 that can be maintained with the use of the earliest and latest sample value. Empirical tests with the thresholder demonstrated that the absolute level of the between-group variance statistic correlated with the quality of the bimodal distribution, reaching its maximum when the bimodal peaks were symmetrical and furthest away (highest contrast), which correlates well with a close-range shadow (maximum contrast) and the judiciously chosen sample window (to get a symmetrical distribution of light and shadow when the sample window is centered on the wiper). The level of the between-group variance, when the peak sample window is centered on a given peak, is retained 630 as a "goodness-of-peak" statistic which is accumulated with the aforementioned interval data, and judged by its mean and standard deviation to reveal consistent wiper peaks.

The peak Otsu values are collected 630 in a data structure 635 along with a timestamp of their occurrence. Then, intervals between all sequential combinations of these peak data nodes are calculated 640 and sorted 645 into a histogram 650 of pairs of peaks, binned by the interval between the peaks. In addition to the histogram of intervals, statistics are kept on the widths of the peaks making up the intervals in any particular histogram bin. The bins are scored 655 for their expected size (number of peaks) given the data window width, and for the accumulated width information to match a wiper event and its standard deviation to be minimal signifying that it represents consistent shadow events. Thresholds for the various parameters are determined empirically from test data.

Bins of intervals represent frequency of occurrence of a given interval. The wiper activity will result in a large number of events of a consistent interval. When a bin of intervals is found 660 whose characteristics exceed the empirical thresholds judging wiper intervals, the Peak-Period Detector triggers the warning light 665 and/or other indicators to the driver.

Finally, the algorithm advances the wide window 670—multi-wiper-interval window—and expires (removes) 675 the Peak List and Histogram entries that fall outside the new window span. Processing resumes with the reception of another ADC input.

Correlation Peak Detection.

Referring to FIG. 7, there is shown in schematic form a depiction of the Correlation Detection algorithm for detecting wiper motion.

This second algorithm is similar to the first except in the method of initially detecting the peaks in the inverted input data which represent shadows cast on the light detector. Once the peaks are detected, this algorithm uses the same data structure of peaks, detection and accumulation of an interval histogram, and thresholded judgment of one of the interval bins as a good wipe interval.

The ADC input 700 from the optical sensor is fed 705 into a running window of data 710. The basic detection of peaks is accomplished by a mathematical correlation function 715. Data for the correlation is accumulated within a narrow window.

The correlation of a peak model 720 on the inverted sample data stream produces a peak-likelihood filtered data stream which is adaptively thresholded 722 (based on a deviation from a running average) to find the peaks. Peak width data is not retained due to the fact that the correlation model already selects for peaks of the proper width. The optimal correlation model is developed empirically to give the best results in a variety of light and noise conditions. Managing 730 and storing 735 the peak data, creation of intervals, judgment of intervals, and decision criteria for triggering the headlights warning is the same as the first algorithm (see FIG. 6).

Discrete Fourier Transform.

Referring now to FIG. 8, there is illustrated in schematic form a depiction of the Discrete Fourier Transform algorithm for detecting wiper motion.

This third algorithm uses a frequency domain transform (Digital Fourier Transform of DFT variant of Fast Fourier Transform or FFT) to convert the inverted input data stream into a running set of frequency content histogram bins. Normally, a DFT calculation is beyond the resources of a modest microcontroller; however, the wiper lights application uses wiper interval frequencies that make the DFT feasible.

The ADC input 800 from the optical sensor is fed 805 into a running window of data 810. Data for the DFT is accumulated within a wide window, encompassing multiple intervals of even slow intermittent wiper activity.

Any consistent frequency will make a narrow, impulse peak in the DFT results 820. The raw results are filtered by an adaptive normalizing threshold algorithm 825. It thresholds local impulse peaks, and adapts its threshold for the absolute level of any given region of the spectrum.

This algorithm judges discovery of wiper activity by scanning the DFT results at each step of the input window and checking each peak for quality (strong impulse character) and appropriate amplitude for the frequency involved. When a frequency bin with the right quality exceeds the empirically-derived threshold 830, the algorithm triggers the headlight warning 835. Processing resumes with the reception of another ADC input.

Signal Processing for Day/Night Detection.

An important feature of the wiper lights device is day/night detection, with a concomitant warning to turn on lights at or after dusk and optionally turn off lights at dawn in the absence of wiper activity.

Finally, referring to FIG. 9, there is illustrated in schematic form the adaptive thresholding algorithm for day/night detection.

Notwithstanding the wiper-motion detection capabilities using the optical sensors, these same sensors are used to detect day versus night via average light levels. A separate software algorithm is executed in the CPU in parallel with the wiper-rhythm detection for day/night detection. The ADC input 900 from the optical sensor is fed 905 into a running window of data 910. This algorithm filters 815 the window of input illumination-level data, accumulating running statistics on the data within the window. The size of the window is adjusted to minimize processing load while providing sufficient filtering of aliasing light events at night like headlights, streetlights, or other environmental lighting. It accumulates 815 simple statistics like mean, median, and standard deviation which give enough data to detect 820 nighttime in the presence of many interfering light sources. These interfering lights have the effect of raising the simple mean sample value to the point where it is hard to differentiate it from an overcast day. However, the median value will still be low, in comparison to the overcast day where the median value will closely track the mean. Also, the standard deviation will be much higher in the presence of very bright lights at night.

When the median falls below a threshold 820, the algorithm triggers the headlight warning 825. Processing resumes with the reception of another ADC input.

What is claimed as invention is:

1. Apparatus for the capture, aggregation, and transfer of data to determine windshield wiper motion in a motor vehicle, comprising:
    motion-sensing hardware including an embedded microprocessor programmed with a rhythm detection algorithm and an interval mapping algorithm for detecting rhythmic movement of shadows in either high contrast or low contrast light conditions and at regular intervals and to instruct said processor to output a signal to an audio or visual output device to produce a perceivable audio or visual indicator so as to alert the driver of the automotive vehicle that it is necessary to turn on the vehicle headlights; and
    an audio or visual output device coupled to said processor for functioning as a warning indicator perceivable by the vehicle driver.

2. The apparatus of claim 1, wherein said visual indicator is a backlit icon.

3. The apparatus of claim 1, wherein said visual indicator is imperative wording advising the driver to turn on the vehicle headlights.

4. The apparatus of claim 1, wherein said audio indicator is an audible alarm.

5. The apparatus of claim 1, wherein said audio indicator is a recorded vocal message with a warning to turn on the vehicle headlights.

6. Apparatus for the capture, aggregation, and transfer of data to determine windshield wiper motion in a motor vehicle, comprising:
    inertial sensors for detecting motions in the vehicle;
    a microprocessor programmed with software to receive digitized signals from said inertial sensors and to sense rhythmic patterns of vibration or motion in the car, to characterize and filter the rhythmic patterns of vibration or motion to accurately distinguish wiper motions from other motions, and thereafter to instruct the microprocessor to take certain actions to alert the driver of the automotive vehicle that vehicle lights must be turned on; and
    an audio or visual output for functioning as a warning indicator perceivable by the vehicle driver.

* * * * *